(12) United States Patent
Washington et al.

(10) Patent No.: US 12,142,303 B2
(45) Date of Patent: Nov. 12, 2024

(54) ENHANCED TRIM ASSISTANCE FOR VIDEO EDITING ENVIRONMENTS

(71) Applicant: Microsoft Technology Licensing, LLC, Redmond, WA (US)

(72) Inventors: David Earl Washington, Saint Paul, MN (US); Justin J. Chando, Bellevue, WA (US); Sophia Siyuan Sun, Bellevue, WA (US); Paul Donnelly Conlin, Saint Paul, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 4 days.

(21) Appl. No.: 17/850,553

(22) Filed: Jun. 27, 2022

(65) Prior Publication Data

US 2023/0420001 A1    Dec. 28, 2023

(51) Int. Cl.
| | | |
|---|---|---|
| *G11B 27/34* | (2006.01) | |
| *G06F 16/78* | (2019.01) | |
| *G06F 16/783* | (2019.01) | |
| *G11B 27/034* | (2006.01) | |
| *G11B 27/036* | (2006.01) | |

(52) U.S. Cl.
CPC .......... *G11B 27/34* (2013.01); *G06F 16/7834* (2019.01); *G06F 16/7867* (2019.01); *G11B 27/034* (2013.01); *G11B 27/036* (2013.01)

(58) Field of Classification Search
CPC ..... G11B 27/34; G11B 27/034; G11B 27/036; G06F 16/7834; G06F 16/7867
See application file for complete search history.

(56) References Cited

U.S. PATENT DOCUMENTS

| | | | |
|---|---|---|---|
| 2016/0179831 A1 | 6/2016 | Turner et al. | |
| 2020/0137433 A1* | 4/2020 | Budd | H04N 21/6587 |
| 2022/0036005 A1 | 2/2022 | De Brébisson et al. | |
| 2022/0068258 A1* | 3/2022 | Jindal | G06F 40/253 |
| 2022/0076024 A1 | 3/2022 | Walker et al. | |
| 2023/0247068 A1* | 8/2023 | Weiss | H04L 65/1069 709/204 |
| 2023/0396833 A1* | 12/2023 | Lewis | H04N 21/4394 |

FOREIGN PATENT DOCUMENTS

| | | |
|---|---|---|
| CN | 111212319 A | 5/2020 |
| WO | 2019000721 A1 | 1/2019 |

OTHER PUBLICATIONS

"International Search Report and Written Opinion Issued in PCT Application No. PCT/US23/022178", Mailed Date: Jul. 21, 2023, 10 Pages.

(Continued)

*Primary Examiner* — Girumsew Wendmagegn

(57) ABSTRACT

In an implementation, a software application on a computing device directs the device to extract audio data from a media file comprising the audio data and video data, generate a trim proposal based on analysis of speech in the audio data, and display a visualization of the trim proposal. A user may supply input comprising a selection of at least a portion of the visualization of the trim proposal, in response to which the device trims the media file.

20 Claims, 13 Drawing Sheets

(56) References Cited

OTHER PUBLICATIONS

"How to Remove Filler Words from Your Video", Retrieved from: https://web.archive.org/web/20210527162300/https://support.loom.com/hc/en-us/articles/360019796378-How-to-remove-filler-words-from-your-video, May 27, 2021, 3 Pages.
Kincaid, Jason, "Using Descript to Remove Filler Words from Audio Recordings", Retrieved from: https://medium.com/descript/using-descript-to-remove-filler-words-from-audio-recordings-2e9b98a5c8af, Jun. 7, 2018, 3 Pages.
Klein, Rebecca, "Transcribing Audio Content: Resources and How-To", Retrieved from: https://www.3playmedia.com/blog/transcribe-audio-content/, Aug. 11, 2021, 6 Pages.

\* cited by examiner

ENHANCED TRIM ASSISTANCE FOR VIDEO EDITING ENVIRONMENTS

TECHNICAL FIELD

Aspects of the disclosure are related to the field of computer software applications including tools for creating, editing, and sharing videos.

BACKGROUND

An increasing number of computer software applications and services allow users to create, edit, and share videos with each other. Social video platforms have become especially popular where users upload short clips to a service to be distributed to their friends, classmates, or other such people in their social network. Indeed, the sharing of short clips has been incorporated into numerous other contexts including classroom tools, office productivity tools, gaming environments, and the like.

Users often desire to edit their video clips before sharing them. Many video editing environments provide controls that allows users to add music to their video, introduce background effects, or otherwise enhance their content. Video trimming is one particular feature that allows a user to remove segments of a video clip. A user may, for example, wish to remove filler words or pauses from a video clip. To do so, the user must hunt through the video clip for instances of undesirable words, phrases, or pauses, and then mark the sub-clips for removal.

Unfortunately, such features are generally manual in that they require a user to specify the range(s) within a clip to be cut. Not only can the task of specifying the range(s) become tedious, but so too can the task of finding the portions of the clip to be cut, even in the context of short video clips. Such drawbacks are only exacerbated with longer clips.

OVERVIEW

Technology is disclosed herein that enhances the user experience with respect to trim features and functionality in video editing environments. In an implementation, a software application on a computing device directs the device to extract audio data from a media file comprising the audio data and video data, generate a trim proposal based on analysis of speech in the audio data, and display a visualization of the trim proposal. A user may supply input comprising a selection of at least a portion of the visualization of the trim proposal, in response to which the device trims the media file.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
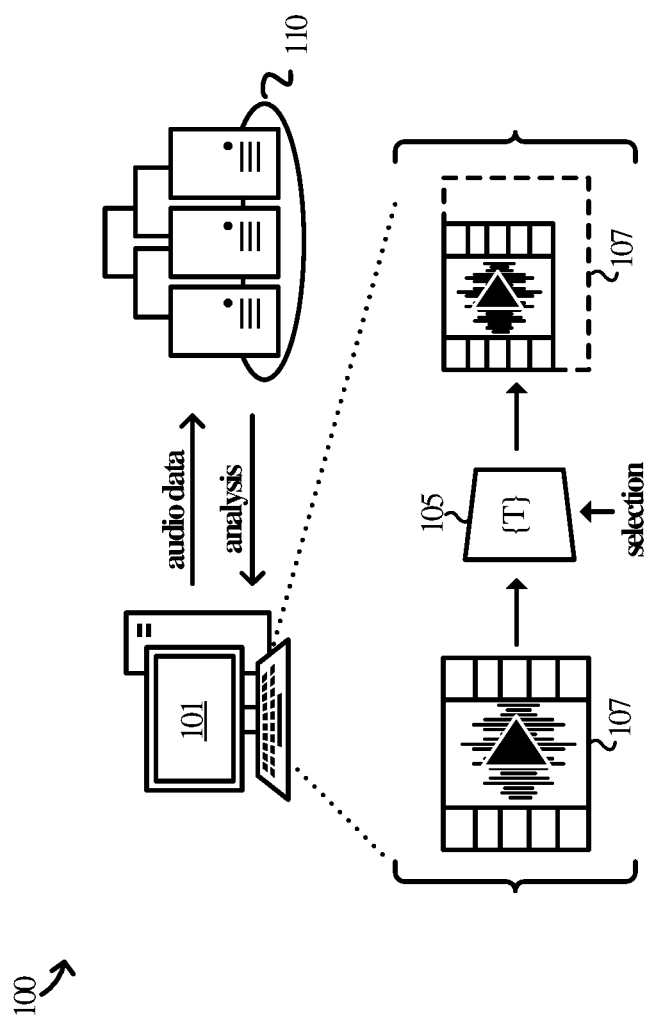
FIG. 1 illustrates operational environment in an implementation.

Various implementations are disclosed herein that the user experience with respect to video editing tools in the context of software applications—and in particular, to features and functionality that allow a user to trim a portion of a video in an automated or semi-automated manner. The enhanced trim capabilities disclosed herein improve the ease of use of video tools and improve the overall experience of capturing, producing, and sharing video. Various technical effects achieved by the implementations disclosed herein include reducing the time and steps required to trim a video, as well reducing the size of the video.

Various implementations described herein employ a trim process on one or more computing devices that allow one or more segments of video to be automatically or semi-automatically removed from a media file. The trim process may be employed locally with respect to a user experience (e.g., on a user's device), remotely with respect to the user experience (e.g., on a server), or distributed between or amongst multiple devices.

In various implementations, such computing devices include one or more processors operatively coupled with one or more computer readable storage media. Program instructions stored on the one or more computer readable storage media, when executed by the one or more processors, direct a given computing device to carry out various steps with respect to a representative trim process. For example, the computing device extracts audio data from a media file that includes audio data and video data, generates a trim proposal indicative of segments of video to potentially trim from a media file, and displays a visualization of the video data and a visualization of the trim proposal. A user may then supply input via a user interface that indicates a selection of at least a portion of the visualization of the trim proposal, and the computing device responsively trims the media file based on the user input.

In some implementations, the trim proposal may be generated based on an analysis of speech represented in the audio data. The analysis may be performed locally with respect to the user experience (e.g., on a client device) or remotely (e.g., on a server computer in the cloud). In the event the speech analysis is performed remotely, the computing device supplies the audio data to an analysis service in the cloud and receives results of the analysis from the analysis service. The results of the analysis may include timestamps that define segments of the audio data determined by the analysis service to represent undesirable portions of the speech such as filler words, long pauses, the like. The computing device identifies the segments of the video based at least on the timestamps, including by identifying segments of the video that correspond to the segments of the audio defined in the results of the analysis by the timestamps.

In some implementations, the visualization of the video data is a linear representation of the video data. Examples of the visualization of the trim proposal include a visual emphasis on the segments of the video data indicated in the trim proposal relative to other segments of the video not indicated in the trim proposal. In some cases, the visualization of the trim proposal is overlaid onto the visualization of the video data. Examples of the selection of a portion of the visualization of the trim proposal include one or more selections of one or more of the segments in the visualization of the video data.

In some implementations, the results of the speech analysis include a transcription of the audio data. The computing device may in some cases display a visualization of the transcription, allowing the visualization of the trim proposal to include a visual emphasis on portions of the visualization of the transcription corresponding to the segments of the audio defined by the timestamps in the results of the analysis. The selection provided by the user input may be of one or more of the portions of the visualization of the transcription (instead of, or in addition to any selections of portions of the visualization of the video data).

Trimming the media file based on the user input may include removing at least one of the segments of the video data from the media file and one or more corresponding segments of the audio data from the media file. The video and auto data may be removed permanently in some cases. Alternatively, the trimmed portions of the media file could be retained in the file, but virtually removed such that playback skips over the trimmed portions. In some cases, a new version of the media file may be created that represents the trimmed version with the trimmed portions of the media file excluded therefrom.

Figure 7:
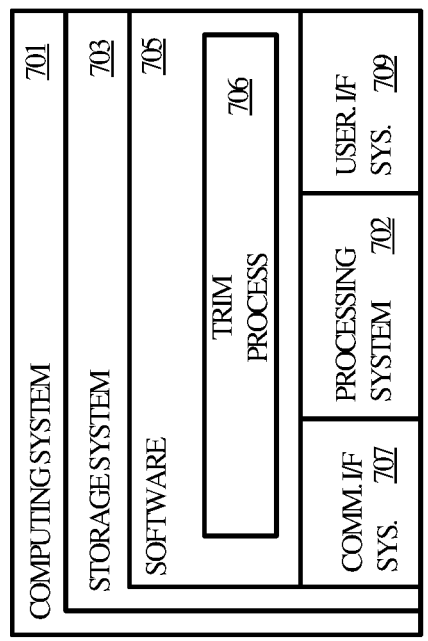
FIG. 7 illustrates a computing system suitable for implementing the various operational environments, architectures, processes, scenarios, and sequences discussed below with respect to the other Figures.

FIG. 1 illustrates an operational environment 100 in an implementation. Operational environment 100 includes computing device 101 and online service 110. Computing device 101 includes one or more software applications capable of employing a trim process with respect to a media file (e.g., media file 107). Computing device 101 may also be capable of driving a user experience including by displaying a user interface to the application, receiving user input via the user interface, and responding to the user input per the trim process. Examples of computing device 101 include personal computers, tablet computers, mobile phones, and any other suitable devices, of which computing device 701 in FIG. 7 is broadly representative. Example applications include video editing applications and video sharing applications, as well as any other application having such capabilities integrated therein. The application may be a natively installed and executed application, a browser-based application, or a mobile application, and may execute in a stand-alone manner, within the context of another application, or in some other manner entirely. It may be appreciated that some of the features and functionality attributed to the application on computing device 101 may be performed by online service 110 in some implementations.

Online service 110 provides one or more computing services to end points such as computing device 101, including a speech analysis service. The speech analysis service provided by online service 110 takes audio data as input and produces a transcription of speech encoded in the audio data. The analysis service may also examine the transcription for the presence of filler words, long pauses, and (optionally) insensitive words or phrases. The analysis service provides an analysis of the speech as output, which only online service 110 may return to the end point that supplied the audio data. Online service 110 may optionally provide a variety of other services including video sharing, file storage, co-authoring and collaboration support, and the like. In some examples, online service 110 may provide a suite of applications and services with respect to a variety of computing workloads such as social sharing, office productivity tasks, email, chat, voice and video, and so on.

Online service 110 employs one or more server computers co-located or distributed across one or more data centers connected to or otherwise in communication with computing device 101. Examples of such servers include web servers, application servers, virtual or physical (bare metal) servers, or any combination or variation thereof, of which computing device 701 in FIG. 7 is broadly representative. Computing device 101 may communicate with online service 120 via one or more internets and intranets, the Internet, wired and wireless networks, local area networks (LANs), wide area networks (WANs), and any other type of network or combination thereof.

Figure 2:
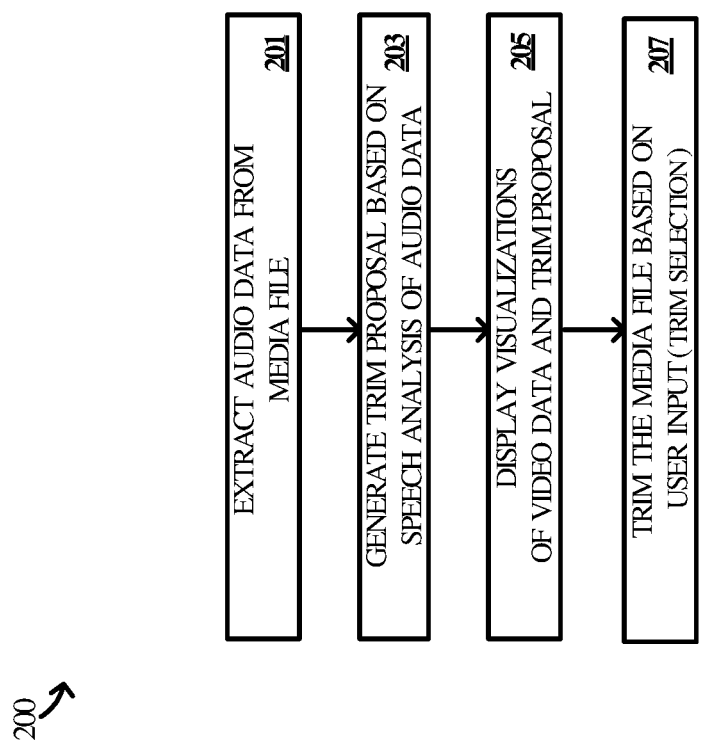
FIG. 2 illustrates a trim process in an implementation.

As mentioned, computing device 101 employs a trim process that improves the video editing capabilities of software applications, of which trim process 200 in FIG. 2 is representative. Trim process 200 may be implemented in program instructions in the context of any of the software applications, modules, components, or other such elements of one or more computing devices. The program instructions direct the one or more computing devices to operate as follows, referring to a computing device in the singular for the sake of clarity.

In operation, a media file includes audio data that represents sounds encoded in accordance with an audio coding format, as well as video data that represents images encoded in accordance with a video coding format. A computing device employing trim process 200 extracts audio data from the media file (step 201) and supplies the audio data to an online service. The service analyzes produces a transcription of speech represented in the audio data and replies with the transcription and timestamps that match the audio stream.

The computing device generates a trim proposal indicative of segments of the video to potentially trim from the media file based on the analysis of the speech provided by the online service (step 203). For example, the computing device may examine the transcription for filler words, lengthy pauses, or other such content to potentially remove from the video. Alternatively, the transcription itself may already identify the filler words, lengthy pauses, and/or other undesirable content. In either case, the computing device uses the timestamps for the audio data to identify corresponding segments of the video data to potentially trim from the media file, which form the basic components of a trim proposal. In other words, the trim proposal is a list of segments of the video data corresponding in-time to portions of the audio data identified as containing filler words, long pauses, and the like.

Next, the computing device displays a visualization of the video data and a visualization of the trim proposal (step 205). The visualization of the video data may be, for example, a linear representation of the video such as a timeline view. The visualization of the trim proposal may be overlaid with respect to the visualization of the video data, allowing a user to easily see which portions of the video are proposed to be cut.

The computing device displays the visualizations in user interface through which the user can supply input with respect to the visualization of the trim proposal. In some cases, the user input may be a selection of a button or other such element in the user interface that directs the computing device to trim all of the portions of the video represented in the trim proposal. In other cases, the user input may be a selection of only a subset of the portions of the video represented in the trim proposal such that the computing device is directed to trim only those select portions. In any case, the computing device receives the user input and responsively trims the media file based on the user input (step 207).

Referring back to FIG. 1, operational environment 100 includes a brief example of trim process 200 as employed by an application on computing device 101. In operation, a user captures a video of a moment or a scene, such as the same or a different person speaking. The moment may be, for example, a presentation given by the user captured by the user's device, a video conference call recorded on the user's device, or any other type of video capture. Here, the video may be captured by computing device 101 or by a different device such as the user's mobile phone, table computer, or the like. The video may be of any duration and quality including short and long clips alike.

The captured video is stored in a media file 107 suitable for replay in the context of any number of media applications and includes both audio data and video data. The media file 107 may also be referred to as a video file, although in either case the resulting file includes both audio data and video data. The audio data comprises audio signals encoded in accordance with a suitable audio codec, while the video data comprises video images encoded in accordance with a suitable video codec.

Computing device 101 (under the control of a software application) extracts the audio data from the media file and sends it to online service 110. Online service 110 generates a transcription of speech represented in the audio data and provides an analysis of the speech to computing device 101. In some cases, online service 110 returns only the transcription. In other cases, online service 110 also analyzes the speech and annotates the transcription with descriptions of portions of the speech. For example, the analysis returned by online service 110 may include timestamps corresponding to moments in the speech content determined to be characteristic of filler words and long pauses. Optionally, the analysis could also identify other characteristics of the speech such as the specific content being discussed at different points in time of the recording, a speaker's voice inflection at different points in time, or the like. In situations where online service 110 returns only the transcription, the software on computing device 101 could perform the speech analysis otherwise attributed to online service 110.

Computing device 101 receives the speech analysis from online service 110 and proceeds to generate a trim proposal for display to the end user. Generating the trim proposal may include examining the annotations in the speech analysis to identify those portions of the audio data that contain filler words and long pauses (or other qualifying characteristics). The computing device then identifies the segments of the video data that correspond in time to segments of the audio data containing the qualifying characteristics. Such meta data may then be transformed into a visualization of the trim proposal such as graphics overlaid with respect to a visualization of the video data. For instance, where the video data is displayed linearly in a timewise representation of the data, trim graphics could be overlaid into portions of the linear representation to indicate that those portions are included in the trim proposal.

A user may select whether to trim all of the proposed segments or just some of the segments. A trim function 105 employed in the context of the software running on computing device 101 takes the user's selection as input and proceeds to trim the media file 107 accordingly. Trimming the media file includes removing both the audio data and the video data designated by the user's selection. The result is a version of media file 107 that is smaller because some of the audio and video data has been removed. The user can then upload the trimmed version of the media file to be shared with other users.

Figure 3:
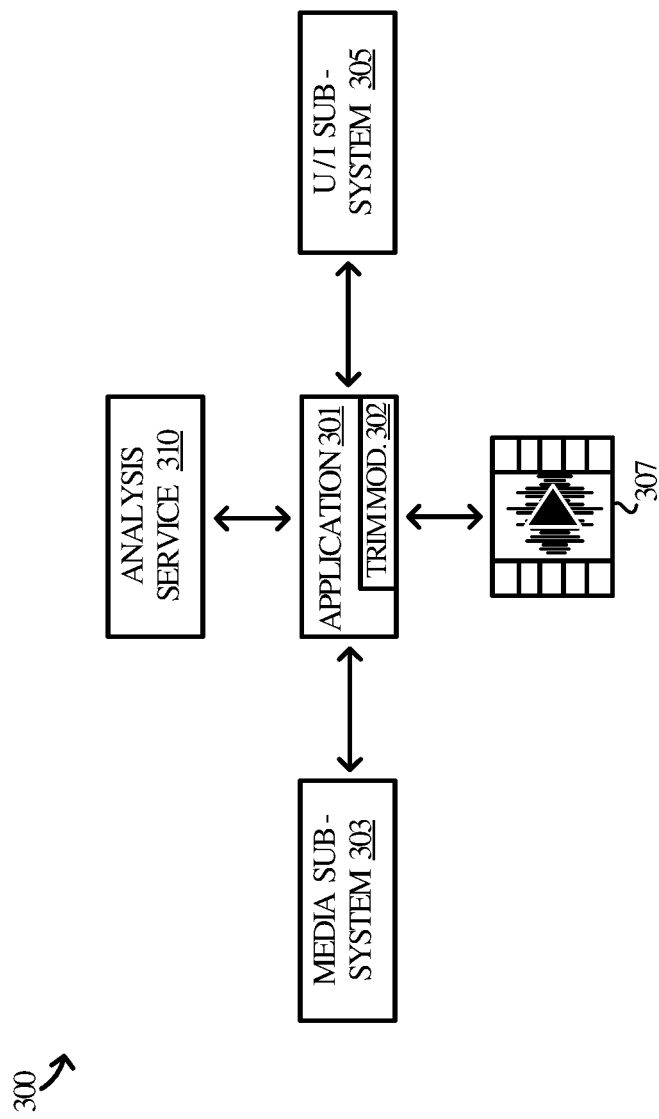
FIG. 3 illustrates a system architecture in an implementation.

FIG. 3 illustrates a system architecture 300 that may be employed in an implementation to provide the enhanced trim capabilities disclosed herein. System architecture 300 includes application 301, media sub-system 303, user interface sub-system 305, and analysis service 310. System architecture 300 may be implemented on a single computing device or distributed amongst multiple computing device and is generally representative of computing hardware, software, and/or firmware elements suitable for performing video trim operations.

Application 301 is representative of any software application or component thereof capable of performing a trim process (e.g., trim process 200). Application 301 interfaces with media sub-system 303, as well as user interface sub-system 305 and analysis service 310. Application 301 includes trim module 302, which is representative of any component or components of application 301 capable of trimming media file 307.

Media sub-system 303 is representative of a sub-system on-board a computing device capable of recording video, examples of which include internal and external cameras and microphones. Media sub-system 303 may be, for example, a laptop camera, a mobile phone camera, an external camera, a camera integrated into a display screen, or any other suitable type of camera, as well as the hardware, software, and firmware layers that connect media sub-system 303 to application 301.

User interface sub-system 305 is representative of a subs-system on-board a computing device capable of a user interface to application 301 and receiving user input. User interface sub-system 305 may include, for example, a display screen on which user interface elements are displayed, input devices through which a user supplies user input, and also the hardware, software, and firmware layers that connect user interface sub-system 305 to application 301.

Analysis service 310 is representative of one or more services capable of analyzing audio data to provide a transcription of speech contained in the audio, as well as analysis of the speech. Analysis service 310 may be implemented remotely from application 301 (e.g., on a different computing device) or it may be implemented in a co-located manner (e.g., on the same computing device as application 301.

Figure 4:
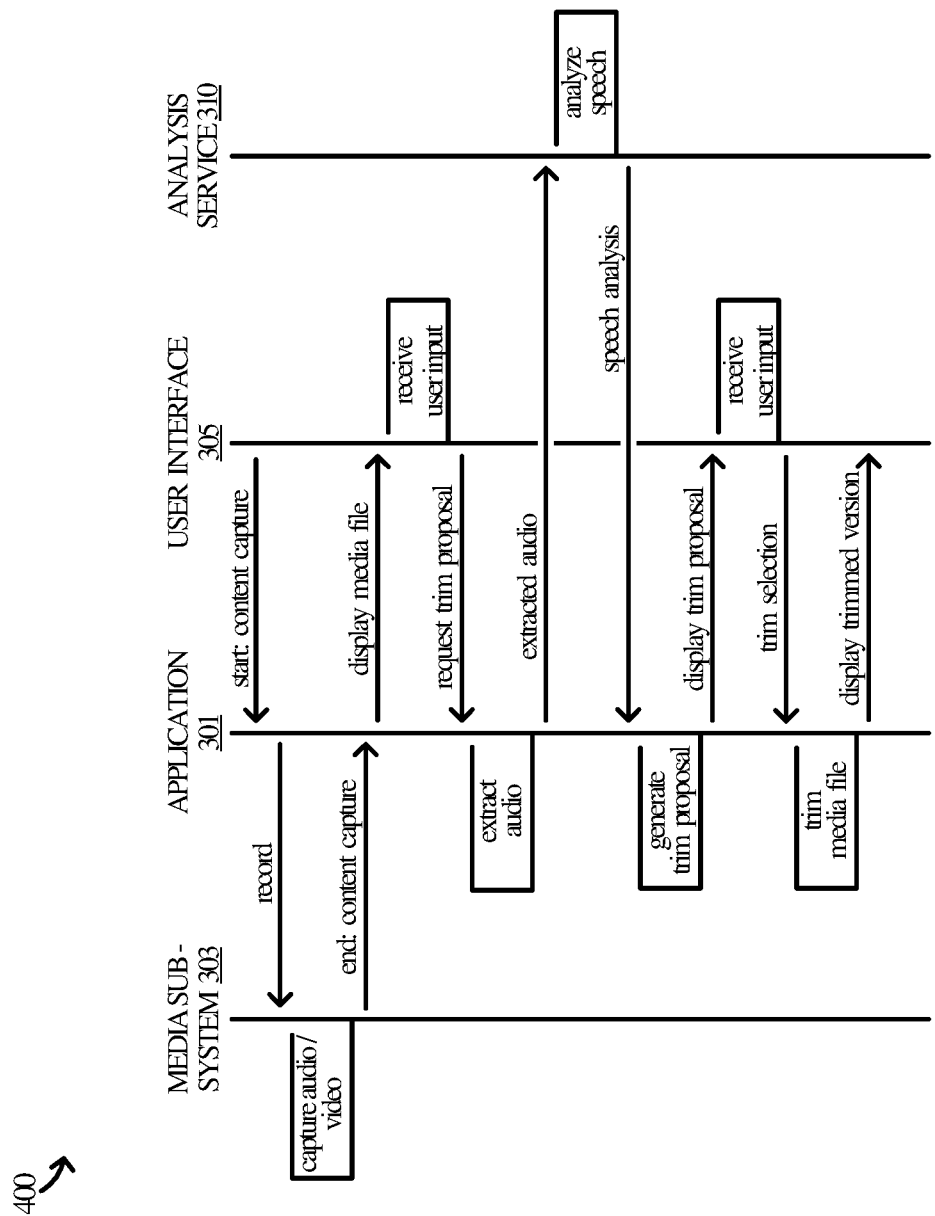
FIG. 4 illustrates an operational scenario in an implementation.

FIG. 4 illustrates an operational scenario 400 that depicts the interoperations of the elements of system architecture 300. In operation, a user engaged with application 413 clicks-on, touches, or otherwise prompts application 301 via user interface sub-system 305 to start capturing content (i.e., record a video). Application 301 responsively engages with media sub-system 303 to begin recording audio and video of a scene. Here, it is assumed for exemplary purposes that the scene being captured is of the same user speaking.

Media sub-system 303 captures the audio and video of the user and saves the data to a media file. Application 301 is able to access the media file in order to play it out on user interface sub-system 305. Accordingly, the video (combined audio and video data) may be rendered and played on a display screen or other such device, including speakers that output audible representations of the audio data.

A screen displayed by user interface sub-system 305 includes various menus and features for interacting with the video including a button to trim the video. User input comprising a selection of the button causes user interface sub-system 305 to communicate the selection to application 301. Application 301 responsively extracts the audio data from the media file and sends it to analysis service 310.

Analysis service 310 receives the audio data and analyzes it to detect and transcribe any speech that may be represented therein. Analysis service 310 replies to application 301 with the transcription, as well as analysis information that characterizes various aspects of the transcription. For example, the analysis information may identify portions of the audio data that contained filler words, long pauses, or other such content.

Application 301 receives the results of the analysis from analysis service 310 and proceeds to generate a trim proposal to be displayed by user interface sub-system 305. To generate the trim proposal, application 301 identifies portions of the video data that correspond to the portions of the audio data flagged by the analysis information has containing filler words, etc. At a minimum, the trim proposal includes a list of the corresponding video segments so identified. Although, in most instances the trim proposal comprises a visual representation of the corresponding video segments, such as a visual representation of the flagged segments displayed in association with a visual representation of the video more generally.

Application 301 supplies the visual representations of the video data and the trim proposal to user interface sub-system 305, to be displayed on a screen or other suitable surface. User interface sub-system 305 displays the visual representations of the video and the trim proposal for the user's consideration. It is assumed here for exemplary purposes that the user determines to trim all or a portion of the video file.

User interface sub-system 305 receives the selection by way of user input and communicates the selection to application 301. Application 301 responsively proceeds to trim the media file in accordance with the selection expressed by the user input. In this example, trim module 302 functions to remove the portions of the audio data and the video data implicated by the user's selection. For example, if the user selected to implement the entire trim proposal, then all of the segments of the video data indicated in the trim proposal would be removed from media file 307, as well as all of the corresponding segments of the audio data. However, were the user to select only a subset of the segments indicated in the trim proposal, then only that subset of the video segments would be removed from the media file 307 (as well as the corresponding subset of audio segments).

Application 301 may then supply the trimmed version of media file 307 to be played-out or otherwise displayed by user interface sub-system 305. The user can preview the trimmed version and may ultimately decide to upload the file to a sharing service or other such destination. The trimmed version of media file 307 will not only have a reduced size, but its content will have fewer filler words and long pauses.

Figure 5A:
FIGS. 5A-5C illustrate a user experience in an implementation.
Figure 5B:
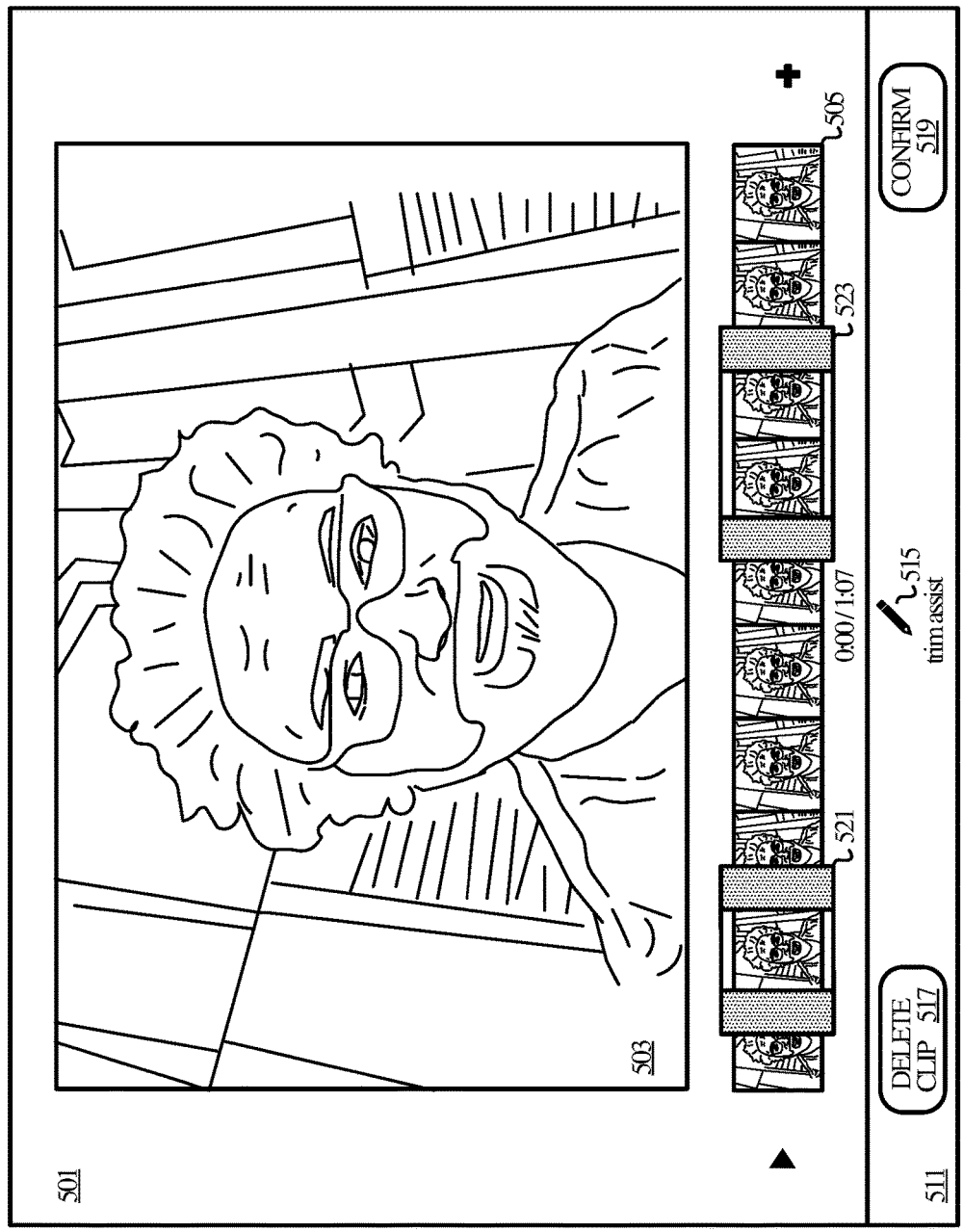
Figure 5C:
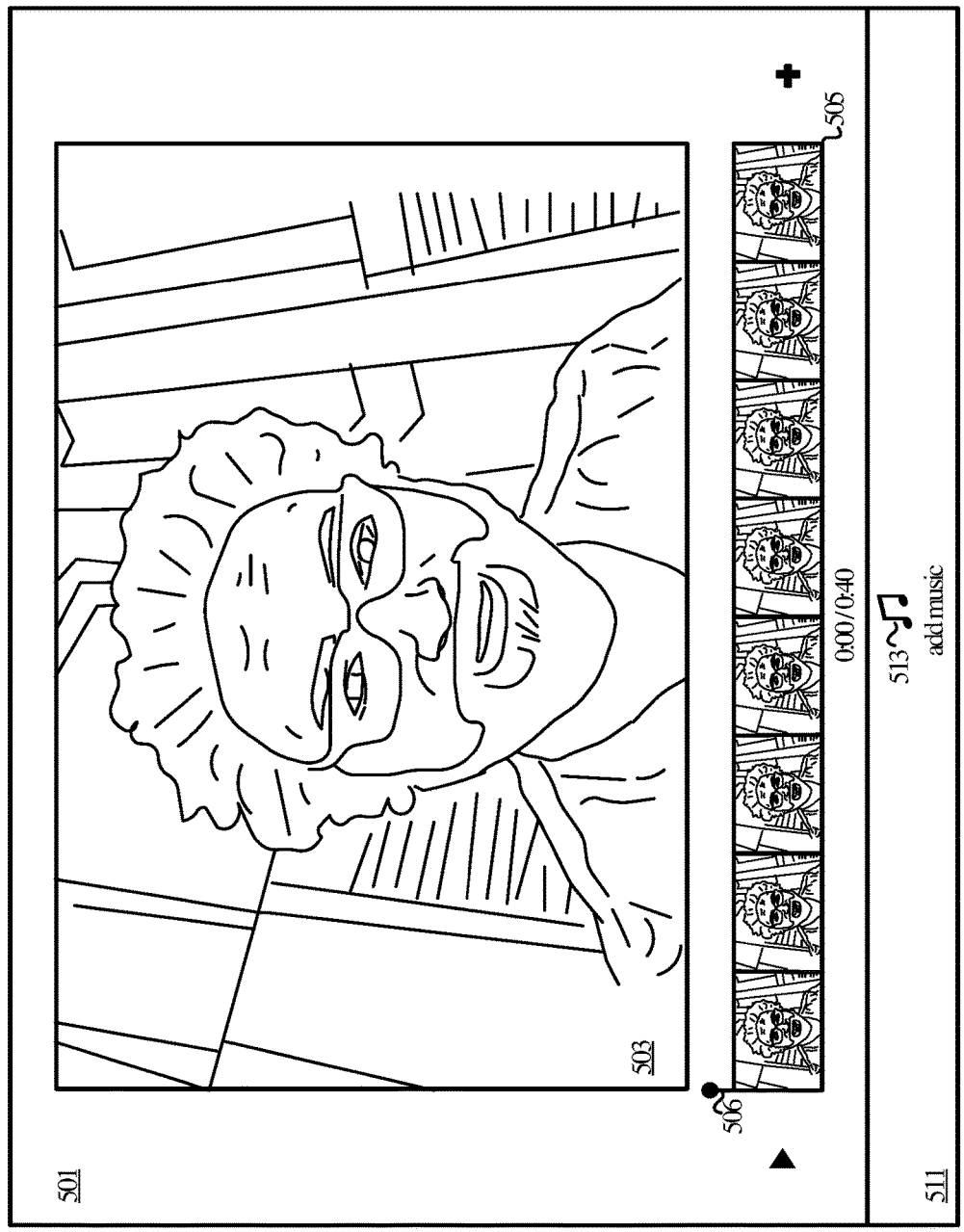

FIGS. 5A-5C illustrate a user experience 500 in an implementation of enhanced trim capabilities. User experience 500 may be produced by a software application executing on a suitable computing device. For example, user experience 500 may be produced by application 301 executing trim process 200 on computing device 101.

User experience 500 begins with the display of a user interface 501 to a video editing application or application component. User interface 501 includes a viewing area 503 within which video may be displayed and played for consumption by a user. User interface 501 also includes a video timeline 505 which includes various frames of the video displayed in a linear, timewise fashion. A user can jump ahead, skip around, or otherwise navigate the video clip, which here has a duration of one-minute and seven-seconds (1:07). Pin 506 is a graphic that indicates where along the timeline the video is presently paused or is playing.

User interface 501 also includes a feature menu 511 that includes various feature elements selectable by a user to launch a feature of the application. Here, feature menu 511 includes an add music button 513 that, when selected, allows a user to add background music to the video displayed in viewing area 503. Feature menu 511 also includes a trim assist button 515 that when selected, launches an enhanced trim assist flow as disclosed herein. Assuming the trim assist button 515 is selected, user experience 500 transitions to FIG. 5B.

In response to the trim assist button 515 being selected, the application driving user interface 501 proceeds to extract the audio data from the video file, obtains an analysis of any speech in the audio data, and generates a trim proposal. The application then surfaces a visualization of the trim proposal in user interface 501.

At this stage in FIG. 5B, feature menu 511 has transitioned to include a delete clip button 517 and a confirm button 519. The delete clip button may be selected by the user to delete the video clip entirely. The confirm button 519 may be selected to proceed with the trim proposal visualized in user interface 501. The visualization of the trim proposal includes borders 521 and 523 around two different segments of the video clip, and the borders 521 and 523 are overlaid with respect to video timeline 505. The user can select one or both highlighted segments—or even select other segments of the video—to be removed from the clip. Once the user is satisfied with the selected segments, the user can select the confirm button 519 to proceed with removing the corresponding portions of the audio and video data from the video file.

In FIG. 5C, it is assumed for illustrative purposes that the user confirmed the trim proposal and the selected video segments were deleted from the file. Accordingly, the video clip has been shortened to forty second (0:40) and the number of video segments displayed in video timeline 505 has been reduced, since fewer remain in the video file.

FIGS. 6A-6E illustrate user experience 600 in another implementation of enhanced trim capabilities. User experience 600 may also be produced by a software application executing on a suitable computing device. For example, user experience 600 may be produced by application 301 executing trim process 200 on computing device 101.

User experience 600 begins with the display of a user interface 601 to a video editing application or application component. User interface 601 includes a viewing area 603 within which video may be displayed and played for consumption by a user. User interface 601 also includes a video timeline 605 which includes various frames of the video displayed in a linear, timewise fashion. A user can jump ahead, skip around, or otherwise navigate the video clip, which here has a duration of one-minute and seven-seconds (1:07). Pin 606 is a graphic that indicates where along the timeline the video is presently paused or is playing.

User interface 601 also includes a feature menu 611 that includes various feature elements selectable by a user to launch a feature of the application. Here, feature menu 611 includes an add music button 613 that, when selected, allows a user to add background music to the video displayed in viewing area 603. Feature menu 611 also includes a trim assist button 615 that when selected, launches an enhanced trim assist flow as disclosed herein. Assuming the trim assist button 615 is selected, user experience 600 transitions to FIG. 6B.

In response to the trim assist button 615 being selected, the application driving user interface 601 proceeds to extract the audio data from the video file, obtains an analysis of any speech in the audio data, and generates a trim proposal. Here, the analysis includes a transcription of the speech in the audio data. The application then surfaces a visualization of the trim proposal in user interface 601, including a visualization 604 of the transcription.

Figure 6A:
FIGS. 6A-6E illustrate a user experience in an implementation.
Figure 6B:
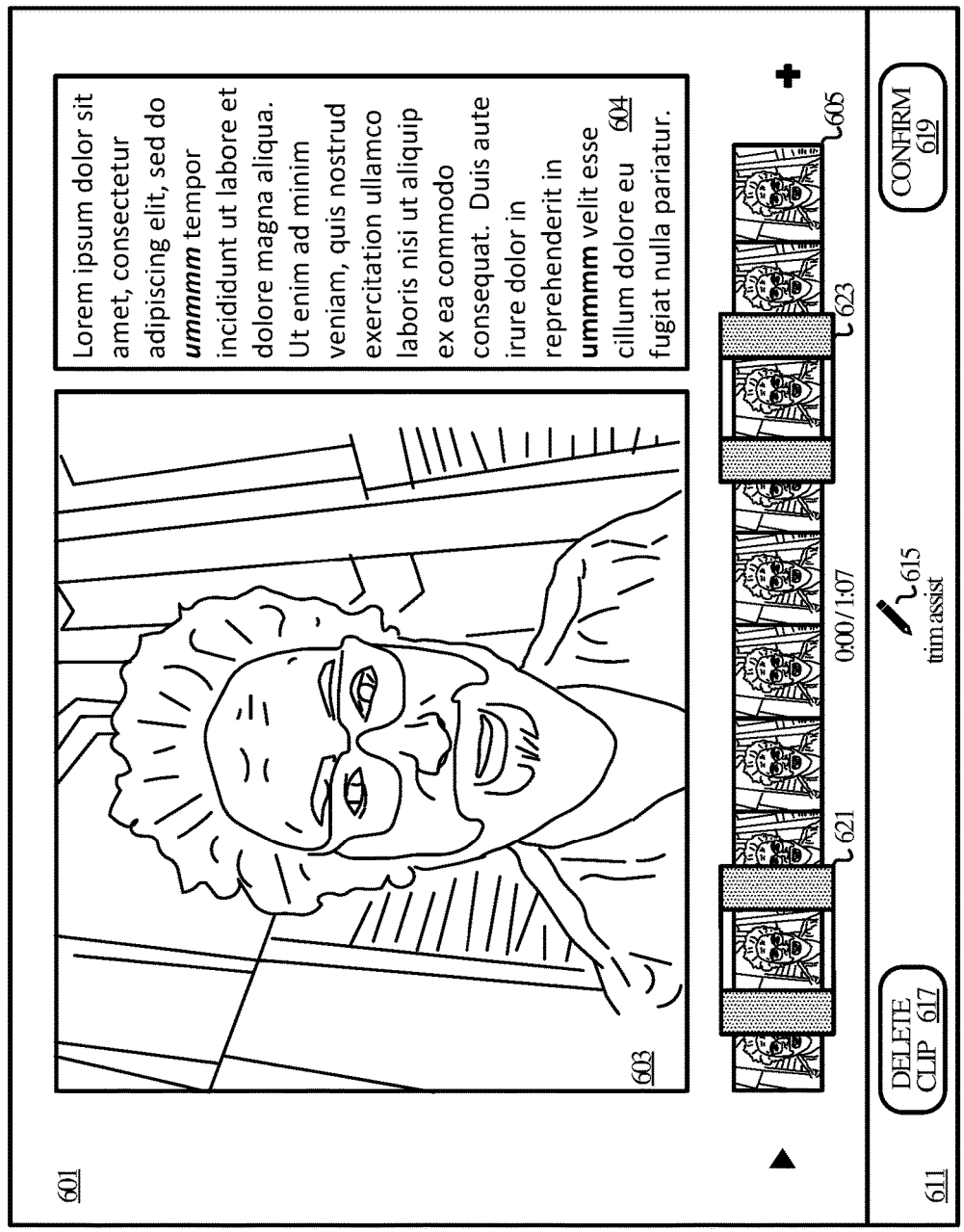

At this stage in FIG. 6B, feature menu 611 has transitioned to include a delete clip button 617 and a confirm button 619. The delete clip button may be selected by the user to delete the video clip entirely. The confirm button 619 may be selected to proceed with the trim proposal visualized in user interface 601. The visualization of the trim proposal includes borders 621 and 623 around two different segments of the video clip, and the borders 621 and 623 are overlaid with respect to video timeline 605.

Note that border 621 and border 623 are overlaid with respect to segments of the video that are assumed for exemplary purposes to correspond in time to instances of filler words in the transcription of the audio (see: two occurrences of "ummmm" in visualization 604 of the transcription). The user can select one or both highlighted segments—or even select other segments of the video—to be removed from the clip.

Figure 6C:
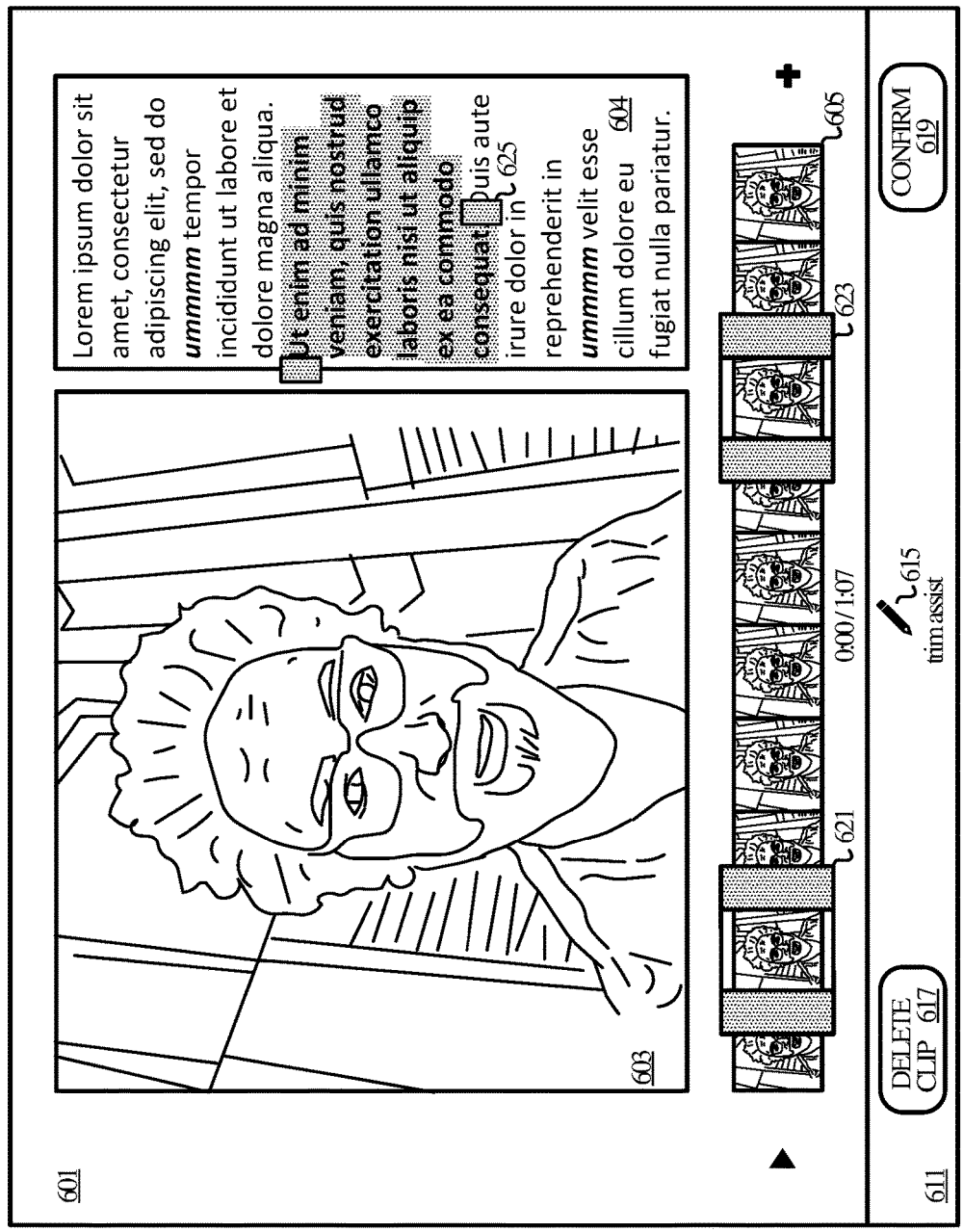
Figure 6D:
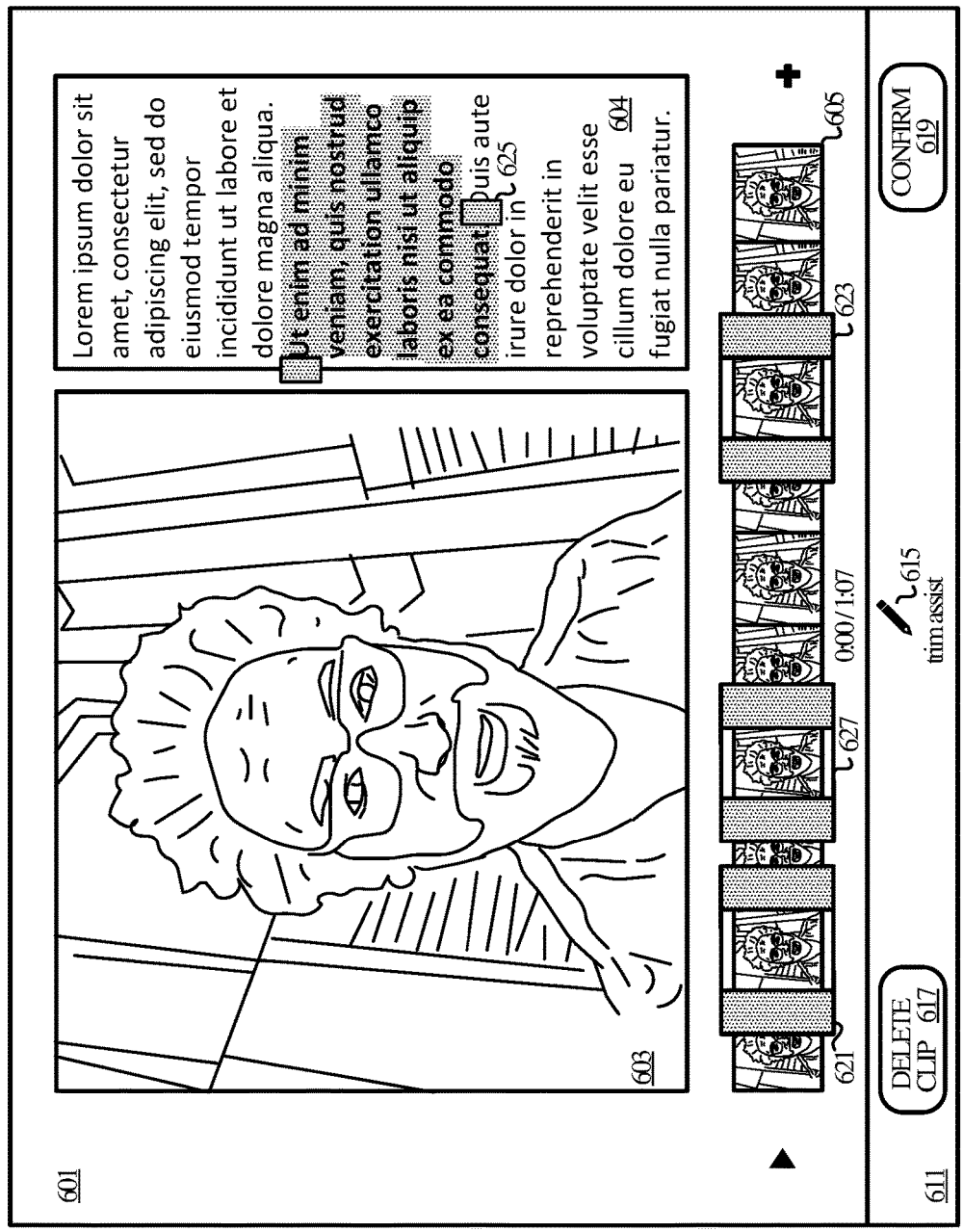

However, the user can also select portions of the visualization 604 of the timeline. In FIG. 6C, the user makes a selection 625 of a sentence in the transcription. The software application translates the timestamps of the transcription to their corresponding points in the video data and integrates the selection into the trim proposal. Thus, in FIG. 6DC, the trim proposal includes a new border 627 around one or more segments of the video that correspond to the section of the transcription by selection 625.

Figure 6E:
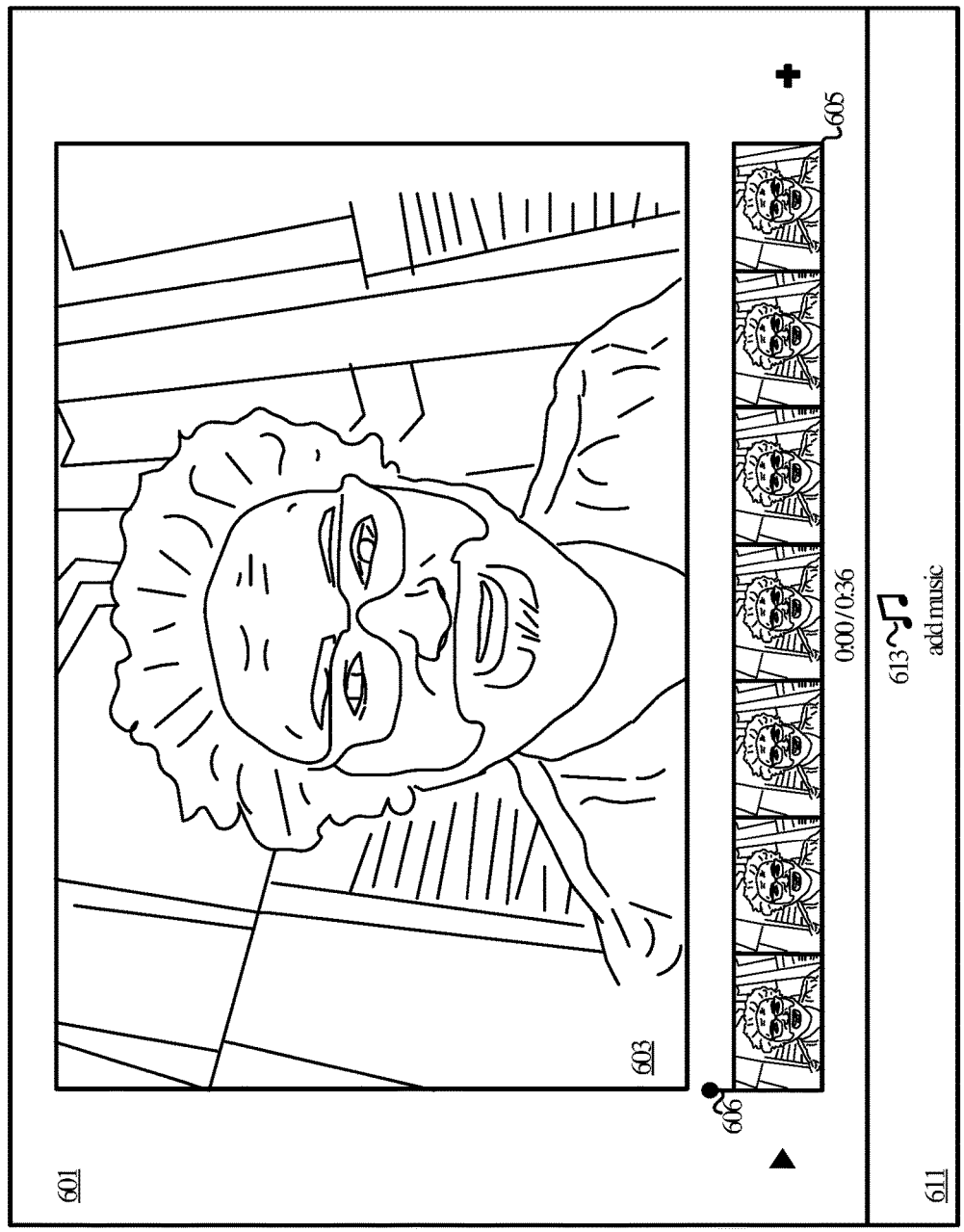

Once the user is satisfied with the selected segments, the user can select the confirm button 619 to proceed with removing the corresponding portions of the audio and video data from the video file. In FIG. 6E, it is assumed for illustrative purposes that the user confirmed the updated trim proposal and the selected video segments were deleted from the file. As such, the video clip has been shortened to thirty-six seconds (0:36) and the number of video segments displayed in video timeline 605 has also been reduced.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements trim process 706, which is representative of the trim processes discussed with respect to the preceding Figures, such as trim process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including trim process 706) may be implemented in program instructions and among other functions may, when executed by processing system 702, direct processing system 702 to operate as described with respect to the various operational scenarios, sequences, and processes illustrated herein. For example, software 705 may include program instructions for implementing a trim process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support enhanced trim features in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such social applications, they apply as well to other contexts such as gaming applications, virtual and augmented reality applications, business applications, productivity applications, and other types of software applications.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   extract audio data from a media file comprising the audio data and video data;
   generate, based at least on an analysis of speech represented in the audio data, a trim proposal indicative of segments of the video data to potentially trim from the media file, wherein the segments of the video data correspond to segments of the audio data determined by the analysis of the speech to include filler words and pauses;
   cause display of a visualization of the trim proposal;
   receive user input comprising a selection of at least a portion of the visualization of the trim proposal; and
   trim the media file based at least on the user input.

2. The computing apparatus of claim 1 wherein, to generate the trim proposal, the program instructions direct the computing apparatus to at least:
   supply the audio data to an analysis service;
   receive results of the analysis from the analysis service, wherein the results of the analysis comprise timestamps that define segments of the audio data determined by the analysis service to represent undesirable portions of the speech; and
   identify the segments of the video data based at least on the timestamps.

3. The computing apparatus of claim 2 wherein, to identify the segments of the video data based at least on the timestamps, the program instructions direct the computing apparatus to identify segments of the video data that correspond to the segments of the audio data defined in the results of the analysis by the timestamps.

4. The computing apparatus of claim 3 wherein:
the program instructions further direct the computing apparatus to cause display of a visualization of the video data, wherein the visualization of the video data comprises a linear representation of the video data;
the visualization of the trim proposal comprises a visual emphasis on the segments of the video data indicated in the trim proposal relative to other segments of the video data not indicated in the trim proposal; and
the selection of at least a portion of the visualization of the trim proposal comprises one or more selections of one or more of the segments in the visualization of the video data.

5. The computing apparatus of claim 4 wherein the results of the analysis further comprise a transcription of the audio data and wherein the program instructions further direct the computing apparatus to cause display of a visualization of the transcription.

6. The computing apparatus of claim 5 the visualization of the trim proposal further comprises a visual emphasis on portions of the visualization of the transcription corresponding to the segments of the audio data defined by the timestamps in the results of the analysis.

7. The computing apparatus of claim 1 wherein the visualization of the trim proposal includes:
a visualization of the segments of the video data to potentially trim, wherein the visualization of the segments shows a beginning point and an end point for each of the segments; and
a visualization of a transcription of at least a portion of the audio data, wherein the visualization of the transcription includes a visual indication of the segments of the audio data corresponding to the segments of the video data to potentially trim.

8. The computing apparatus of claim 1 wherein, to trim the media file based at least on the user input, the program instructions direct the computing apparatus to remove at least one of the segments of the video data from the media file and to remove one or more corresponding segments of the audio data from the media file.

9. The computing apparatus of claim 1 wherein the program instructions direct the computing apparatus to overlay the visualization of the trim proposal onto a visualization of the video data.

10. The computing apparatus of claim 1 wherein the filler words include one or more of the words: "um" and "uh".

11. A method comprising:
extracting audio data from a media file comprising the audio data and video data;
generating, based at least on an analysis of speech represented in the audio data, a trim proposal indicative of segments of the video data to potentially trim from the media file, wherein the segments of the video data correspond to segments of the audio data determined by the analysis of the speech to include filler words and pauses;
causing display of the trim proposal;
receiving user input comprising a selection of at least a portion of the visualization of the trim proposal; and
trimming the media file based at least on the user input.

12. The method of claim 11 wherein generating the trim proposal comprises:
supplying the audio data to an analysis service;
receiving results of the analysis from the analysis service, wherein the results of the analysis comprise timestamps that define segments of the audio data determined by the analysis service to represent undesirable portions of the speech; and
identifying the segments of the video data based at least on the timestamps.

13. The method of claim 12 wherein identifying the segments of the video data based at least on the timestamps comprises identifying segments of the video data that correspond to the segments of the audio data defined in the results of the analysis by the timestamps.

14. The method of claim 12 wherein:
the method further comprises causing display of a visualization of the video data, wherein the visualization of the video data comprises a linear representation of the video data;
the visualization of the trim proposal comprises a visual emphasis on the segments of the video data indicated in the trim proposal relative to other segments of the video data not indicated in the trim proposal; and
the selection of at least a portion of the visualization of the trim proposal comprises one or more selections of one or more of the segments outlined in the linear representation of the video data.

15. The method of claim 14 wherein the results of the analysis further comprise a transcription of the audio data and wherein the method further comprises causing display of a visualization of the transcription.

16. The method of claim 15 the visualization of the trim proposal further comprises a visual emphasis on portions of the visualization of the transcription corresponding to the segments of the audio data defined by the timestamps in the results of the analysis.

17. The method of claim 11, wherein the visualization of the trim proposal includes:
a visualization of the segments of the video data to potentially trim, wherein the visualization of the segments shows a beginning point and an end point for each of the segments; and
a visualization of a transcription of at least a portion of the audio data, wherein the visualization of the transcription includes a visual indication of the segments of the audio data corresponding to the segments of the video data to potentially trim.

18. The method of claim 11 further comprising overlaying the visualization of the trim proposal onto a visualization of the video data.

19. The method of claim 11 wherein segments of the video data correspond to segments of the audio data determined by the analysis of the speech to include undesirable content.

20. One or more computer readable storage media having program instructions stored thereon that, when executed by one or more processors of a computing device, direct the computing device to at least:
extract audio data from a media file comprising the audio data and video data;
generate, based at least on an analysis of speech represented in the audio data, a trim proposal indicative of segments of the video data to potentially trim from the media file, wherein the segments of the video data correspond to segments of the audio data determined by the analysis of the speech to include filler words and pauses;

cause display of a visualization of the trim proposal;
receive user input comprising a selection of at least a portion of the visualization of the trim proposal; and
trim the media file based at least on the user input.

* * * * *